March 24, 1964  G. F. STAMPER  3,126,182
PIPE CLAMP OR HANGER
Filed July 14, 1961
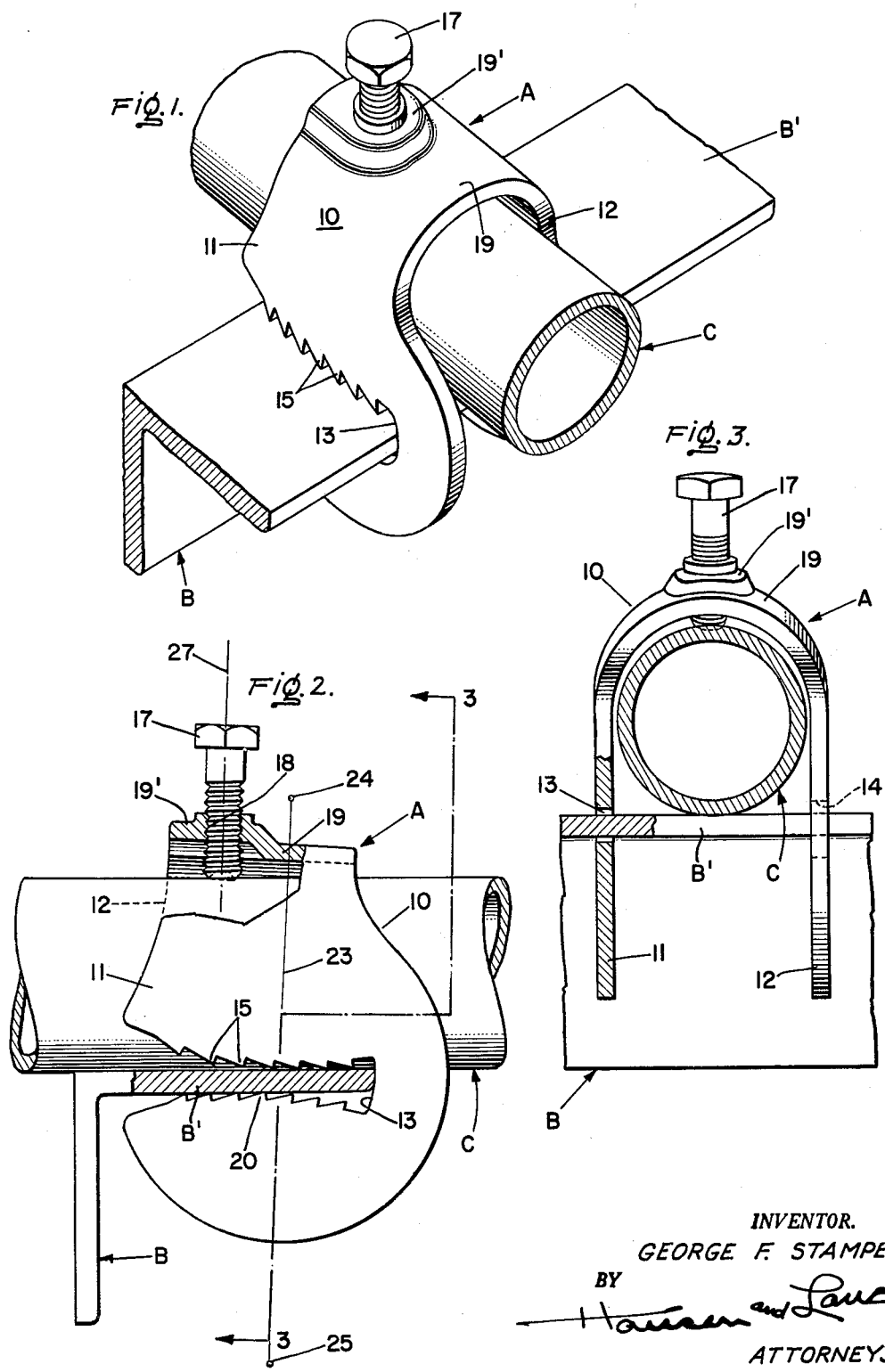
INVENTOR.
GEORGE F. STAMPER,
BY
ATTORNEYS.

United States Patent Office 3,126,182
Patented Mar. 24, 1964

3,126,182
PIPE CLAMP OR HANGER
George F. Stamper, 3050 Mark Ave., Santa Clara, Calif.
Filed July 14, 1961, Ser. No. 124,081
3 Claims. (Cl. 248—72)

The present invention relates to a pipe clamp or hanger, and pertains more particularly to such a mechanism for attaching a pipe or electrical conduit to a flanged, structural building member.

Many buildings, particularly commercial and industrial buildings, employ structural steel members for framing and bracing purposes. It is frequently desirable to run piping for gas, water, compressed air, or other fluids, as well as electrical conduit, through the walls, floors and ceilings of such buildings, and in so doing, such piping frequently runs closely adjacent to structural steel members of the building. Since electrical conduit is a form of pipe, the term "pipe" as used in the present description and the accompanying claims is intended to include conduit and other forms of pipe and tubing which the invention is obviously capable of supporting. Also as used herein the term "pipe clamp" is intended to mean "pipe clamp and hanger."

In the past, various pipe clamps have been devised, but as far as is shown such prior clamps have been either cumbersome or expensive, or have failed to provide a strong locking action which would securely retain a pipe in position and prevent shifting of either the clamp or the pipe relative to a structural member to which the pipe was secured.

The present invention provides an improved pipe clamp for anchoring a pipe to a flange of a structural steel member.

Another object of the invention is to provide a U-shaped pipe clamp of a size to straddle a pipe of known diameter, and having a pair of notches extending into corresponding sides of the U-shaped member to receive therein a flange of a structural member, screw means being provided on the transverse portion of the U-shaped member for tilting the latter about a fulcrum provided by the shape and position of the notches.

A further object of the invention is to provide a pipe clamp having U-shaped body of a size to receive in the bight of the U a pipe of known diameter, the two sides of the U-shaped body having similar notches therein a side of each notch being curved to provide a rocking fulcrum, and the notches being shaped to grip both sides of a flange of a structural member inserted therein, force multiplying means being provided to engage a pipe inserted in the notches in offset relation to such fulcrum for rocking the clamp into powerful, gripping engagement with such pipe, and also with the flange of a structural member inserted in the notches.

These, and other objects and advantages of the invention, will be apparent from the following description and the accompanying drawings, wherein:

FIG. 1 is a fragmentary, perspective view of a pipe clamp embodying the invention, the clamp being shown as it appears in operative position clamping a short length of pipe to a short length of angle steel structural material.

FIG. 2 is a side elevational view of the assembly shown in FIG. 1, portions thereof being broken away.

FIG. 3 is a sectional view, partly in end elevation, of the assembly shown in FIGS. 1 and 2, the pipe and a left hand portion of the clamp being shown in section as taken along line 3—3 of FIG. 2.

Briefly, the illustrated embodiment of the invention comprises a pipe clamp A having a U-shaped body portion 10. The parts will be described in their upright position as shown in the drawings, but obviously the clamp A will perform its clamping function regardless of its position. The clamp body 10 has wide side portions 11 and 12, with notches 13 and 14, respectively therein. The notches 13 and 14 are laterally opposite each other, and are of a width to receive therein a flange B' of a structural steel building member B.

The upper and lower edges of the notches 13 and 14 are arcuate, as best shown in FIG. 2, and preferably are provided with gripping teeth 15 for securely gripping a flange B' when the latter is inserted in the notches. A set screw 17 is screwed into a threaded hole 18 provided therefor in the transverse top portion 19 of the clamp. This screw when screwed in to engage a pipe C spanned by the clamp A rocks the entire clamp in a clockwise direction, as viewed in FIG. 2, and forces the toothed edges of the notches 13 and 14 into secure, gripping engagement with the structural member B, while the set screw 17 anchors itself firmly to the pipe C.

Referring to the drawings in greater detail, the illustrated clamp A consists of the U-shaped body portion 10, and the set screw 17. The body portion 10 preferably is made from a flat blank (not shown) of suitable material such as sheet steel. The shape of such blank in its flat form, and the manner of making it, will be obvious to anyone familiar with sheet metal punching and forming operations, and need not, therefore, be described herein. A suitable grade and thickness of steel or other metal, together with heat treatment recommendations therefor to provide a clamp of the desired strength, hardness, toughness or other characteristics required for the intended use, will be available from any mill or warehouse suppling the metal.

The arcuate transverse top portion 19 of the U-shaped clamp body 10 is of a diameter slightly greater than that of the largest pipe C for which the clamp is intended. An embossment 19' preferably is provided on the top portion 19, and the screw hole 18 is provided therein.

It is proposed to manufacture the clamp A in different sizes as required to receive widely different sizes of pipe, but it will be obvious that the clamp A illustrated, for example, will be suitable for mounting pipes (not shown) smaller than that illustrated as long as any such pipe is within effective reach of the set screw 17 when the latter is screwed in to rock the clamp A into gripping relation with such pipe.

The two side portions 11 and 12 of the clamp body 10 are identical, and are of sufficient width, length and thickness to provide the strength necessary to withstand without bending or undue distortion the powerful, rocking stresses produced by the set screw 17 when the latter is screwed to bear against a pipe C.

The notches 13 and 14 in the body side portions 11 and 12, respectively, are also identical with each other, and both face in the same direction. Each notch is of a width at its narrowest point 20 (FIG. 2) to receive therein a flange B' of the maximum thickness for which the clamp is designed. Since a great deal of the structural steel used in the floor, wall and ceiling structures with which the clamp A is to be used have flanges of approximately ¼ inch in thickness, it is proposed to provide clamps with notches to receive this thickness. However, clamps with other widths of notches may be provided as required.

The upper and lower edges of each notch 13 and 14 are arcuately curved, and with their centers of curvature offset lengthwise of the notches from the axis 27 of the set screw 17. For example, the respective centers of curvature 24 and 25 of the upper and lower edges of the notch 13 as shown in FIG. 4 may be along the line 23, which is spaced longitudinally from the axis 27 of the clamp screw 17. This offsetting arrangement insures that when the clamp body 10 is in clamping position over a pipe C of a size for which the clamp A is intended, as shown in FIGS. 1–3, and the set screw 17 is screwed in to bear against such pipe, the resultant rocking action of the clamp A urges the curved edges of the notches 13 and 14 into gripping engagement with a flange B' inserted in the notches.

In using the pipe clamp A, a pipe C to be secured to a flanged structural member B is positioned so that the pipe lies substantially flat against a flange B' of such structural member as shown in FIGS. 1–3. A clamp A of a size to freely receive the pipe C therein, and having notches 13 and 14 of a width to receive the flange B' of such structural member therein, is then placed astraddle of such pipe C at one side of the structural member B, with the open sides of the notches 13 and 14 facing the flange B', and the set screw 17 screwed upwardly clear of the pipe C. The clamp A is then moved axially along the pipe C to bring the flange B' well into the notches 13 and 14, and preferably to the full limit of movement thereinto.

The set screw 17 is then screwed down to bear firmly on the pipe C, and thereby rocks the clamp A in a clockwise direction as viewed in FIG. 2. Turning of the set screw 17 is continued until a firm seating of the screw is felt, at which time the upper and lower edges of the notches 13 and 14 will have been rocked into firm, gripping engagement with the flange B, and the set screw 17 will also be in firm, gripping engagement with the pipe C.

As the set screw 17 is screwed inwardly against a pipe C, it raises the clamp body 10 to bring the curved lower edges of the notches 13 and 14 into engagement with the under side of the flange B' inserted in the notches. Since these initial points of engagement of the lower notch edges of the notches with the flange B' are, as explained previously herein, offset from the axis 27 of the set screw 17, and as is shown clearly in FIG. 2, continued turning in of the set screw 17 rocks the clamp body A in a clockwise direction as viewed in FIG. 2. This rocking action brings the upper edges of the notches 13 and 14 into powerful gripping engagement with the top of the flange B', and thereby exerts a powerful gripping action on the flange B' inserted therebetween. Thus, the pipe C, the clamp A and the structural member B are all securely interconnected, and a strong, rigid mounting of the pipe C is provided.

The invention provides a simple, inexpensive, strong, easily applied pipe clamp. The clamp can be easily and inexpensively manufactured, at high speed, and with simple manufacturing equipment.

It is contemplated that if desired the clamp may be made in two grades. One grade would be of high quality, heat treated alloy to provide an extremely strong clamp with sharp, hard teeth for actual penetration of the structural member when rocked into gripping relation therewith as explained previously herein. Such clamp would be recommended for conditions of severe vibration or stress. Another, or standard, grade, which would be less expensive, would be of medium carbon content, hot rolled steel plate, and would be recommended for conditions of normal stresses.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A pipe clamp comprising a U-shaped body of a size to receive a pipe of known diameter freely therein, a wide leg portion on each side of the U-shaped body and extending from the closed end thereof a distance greater than the diameter of such pipe, a narrow, elongated notch in an edge of each leg portion, said notches being similar, and laterally opposite, to each other, each of said notches being of a width to receive, with slight clearance, a flange of known thickness edgewise therein, said notches being of a depth to receive a substantial width of such flange therein, and spaced from the closed end of the U-shaped body by substantially the diameter of such pipe, and a set screw threadedly inserted in the closed end of said U-shaped body with the axis of said screw on a longitudinal mid-plane of the U-shaped body, the upper and lower edges of each of said notches being arcuately curved and their centers of curvature offset longitudinal of the body from the axis of the set screw, whereby, upon screwing in the set screw against said pipe fitted into the closed end of said U-shaped body, and with such flange inserted fully into said notches, the clamp is rocked to thereby cause both edges of both notches to grip such inserted flange therebetween.

2. A pipe clamp comprising a U-shaped body of a size to receive a pipe of known diameter freely therein, a wide leg portion on each side of the U-shaped body and extending from the closed end thereof a distance greater than the diameter of such pipe, a narrow, elongated notch in an edge of each leg portion, said notches being similar, and laterally opposite, to each other, each of said notches being of a width to receive, with slight clearance, a flange of known thickness edgewise therein, said notches being of a depth to receive a substantial width of such flange therein, and spaced from the closed end of the U-shaped body by substantially the diameter of such pipe, and a set screw threadedly inserted in the closed end of said U-shaped body with the axis of said screw on a longitudinal mid-plane of the U-shaped body, the upper and lower edges of each of said notches being arcuately curved and serrated, and their centers of curvature offset longitudinally of the body from the axis of the set screw, whereby, upon screwing in the set screw against said pipe fitted into the closed end of said U-shaped body, and with such flange inserted fully into said notches, the clamp is rocked to thereby cause both serrated edges of both notches to bite into and grip such inserted flange therebetween.

3. A pipe clamp comprising a U-shaped body of a size to seat in the bight of the U thereof a pipe of known diameter, each side of the U-shaped body having a narrow, elongated notch extending transversely therein of a size, and so positioned, as to receive, with slight clearance, edgewise therein, a flange of known thickness positioned flat against a pipe of such known diameter seated in the bight of the U-shaped body, the side of each notch remote from the bight of said U-shaped body being curved to provide a rocking fulcrum, and force multiplying means acting between the U-shaped body and such pipe in offset relation to such fulcrum lengthwise of the notches to rock the clamp edge portions defining both sides of both notches into powerful, gripping engagement with such flange inserted in such notches.

References Cited in the file of this patent
UNITED STATES PATENTS

| | | |
|---|---|---|
| 1,326,802 | Strathern | Dec. 30, 1919 |
| 1,417,378 | Handy | May 23, 1922 |
| 2,567,659 | Valenta | Sept. 11, 1951 |

FOREIGN PATENTS

| | | |
|---|---|---|
| 660,026 | Great Britain | Oct. 31, 1951 |